(12) United States Patent
Venkatachalam

(10) Patent No.: US 9,397,899 B2
(45) Date of Patent: Jul. 19, 2016

(54) TECHNIQUES FOR FRACTIONAL WIRELESS BROADBAND USAGE

(71) Applicant: Intel Corporation, Santa Clara, CA (US)

(72) Inventor: Muthaiah Venkatachalam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 542 days.

(21) Appl. No.: 13/627,343

(22) Filed: Sep. 26, 2012

(65) Prior Publication Data

US 2014/0086103 A1    Mar. 27, 2014

(51) Int. Cl.
*H04L 12/24* (2006.01)
*H04L 12/14* (2006.01)

(52) U.S. Cl.
CPC ........ *H04L 41/5003* (2013.01); *H04L 12/1453* (2013.01); *H04L 41/5006* (2013.01); *H04L 41/5029* (2013.01)

(58) Field of Classification Search
CPC ............ H04L 41/5006; H04L 41/5029; H04L 41/5003; H04L 12/1453; H04L 47/00; H04L 41/5051; H04L 12/1435; H04L 41/50; H04L 41/5041; H04L 63/08; H04L 63/0853; H04W 4/24; H04W 4/26; H04W 12/06; H04W 28/08
USPC ........... 370/259; 455/405–409, 411, 410, 453
See application file for complete search history.

(56) References Cited

U.S. PATENT DOCUMENTS

| | | | |
|---|---|---|---|
| 7,877,496 B2 * | 1/2011 | Stevens et al. | 709/229 |
| 8,265,676 B2 * | 9/2012 | Omar | H04W 28/18 370/238 |
| 8,391,832 B2 * | 3/2013 | Gonzalez et al. | 455/406 |
| 8,850,030 B2 * | 9/2014 | Petersson et al. | 709/227 |
| 2002/0065907 A1 * | 5/2002 | Cloonan et al. | 709/223 |
| 2002/0075844 A1 * | 6/2002 | Hagen | H04L 63/0442 370/351 |
| 2005/0182718 A1 * | 8/2005 | Kortum et al. | 705/40 |
| 2006/0041931 A1 | 2/2006 | Boxall et al. | |

(Continued)

OTHER PUBLICATIONS

International Search Report and Written Opinion received for PCT Patent Application No. PCT/US2013/047439, mailed Sep. 6, 2013, 10 pages.

(Continued)

*Primary Examiner* — Mark Rinehart
*Assistant Examiner* — Kenneth P Hunt

(57) ABSTRACT

Examples are disclosed for fractional wireless broadband usage. In some examples, a portal managed by a usage manager may be accessed to enable a user of a wireless device to establish an agreement with the usage manager for the use of an application via a wireless wide area network (WWAN). The agreement may include policies associated with limits to data bandwidth utilized while the application is used via the WWAN. For these examples, access may be obtained to the WWAN through an operator of the WWAN. The access may be obtained via presentation of credentials to authenticate the wireless device to the operator of the WWAN. Also, other credentials may be presented to authenticate the wireless device or a user of the wireless device for use the application via the WWAN. The application may then be executed at the wireless device according to the agreement. Also, for these examples, the application may be provided by an application service provider having a service level agreement with the usage manager and/or the operator of the WWAN for providing the application for use via the WWAN. Other examples are described and claimed.

24 Claims, 11 Drawing Sheets

System 100

(56) References Cited

U.S. PATENT DOCUMENTS

| | | | |
|---|---|---|---|
| 2008/0057923 A1* | 3/2008 | Pousti | 455/414.3 |
| 2009/0279444 A1* | 11/2009 | Ravindran | H04L 41/5003 370/252 |
| 2009/0296700 A1* | 12/2009 | Stevens | H04L 12/5695 370/389 |
| 2010/0083244 A1* | 4/2010 | Bothwell et al. | 717/174 |
| 2012/0195196 A1* | 8/2012 | Ghai | H04W 28/24 370/235 |

OTHER PUBLICATIONS

Aib et al., "A Multi-Party Approach to SLA Modeling", IEEE, 2005, 7 pages.

* cited by examiner

Storage Medium 600

*Computer Executable Instructions for 500*

*FIG. 6*

Storage Medium 900

*Computer Executable Instructions for 800*

*FIG. 9*

TECHNIQUES FOR FRACTIONAL WIRELESS BROADBAND USAGE

BACKGROUND

Affordable, convenient and ubiquitous broadband connectivity may be highly desirable for users of wireless devices. For example, users of mobile wireless devices such as smartphones, tablets, ultrabooks, netbooks, laptops, etc. may want the ability to affordably use increasing computing capabilities of these wireless devices. Also, wireless wide area networks (WWANs) using mobile telecommunications cellular network or wireless broadband technologies are continually adding broadband capacity to meet the demand resulting from a rapidly growing user base for these types of wireless devices. However, users of wireless devices may become frustrated by high costs, data usage limits or confusing payment schemes resulting from attempts to utilize the full computational power of their wireless devices via a WWAN. In particular, when a user uses applications such as social media applications which may involve a relatively large amount of data being uploaded from or downloaded to a wireless device via a WWAN.

BRIEF DESCRIPTION OF THE DRAWINGS

FIG. 6 illustrates an example of a first storage medium.
FIG. 9 illustrates an example of a second storage medium.

DETAILED DESCRIPTION

Figure 1:
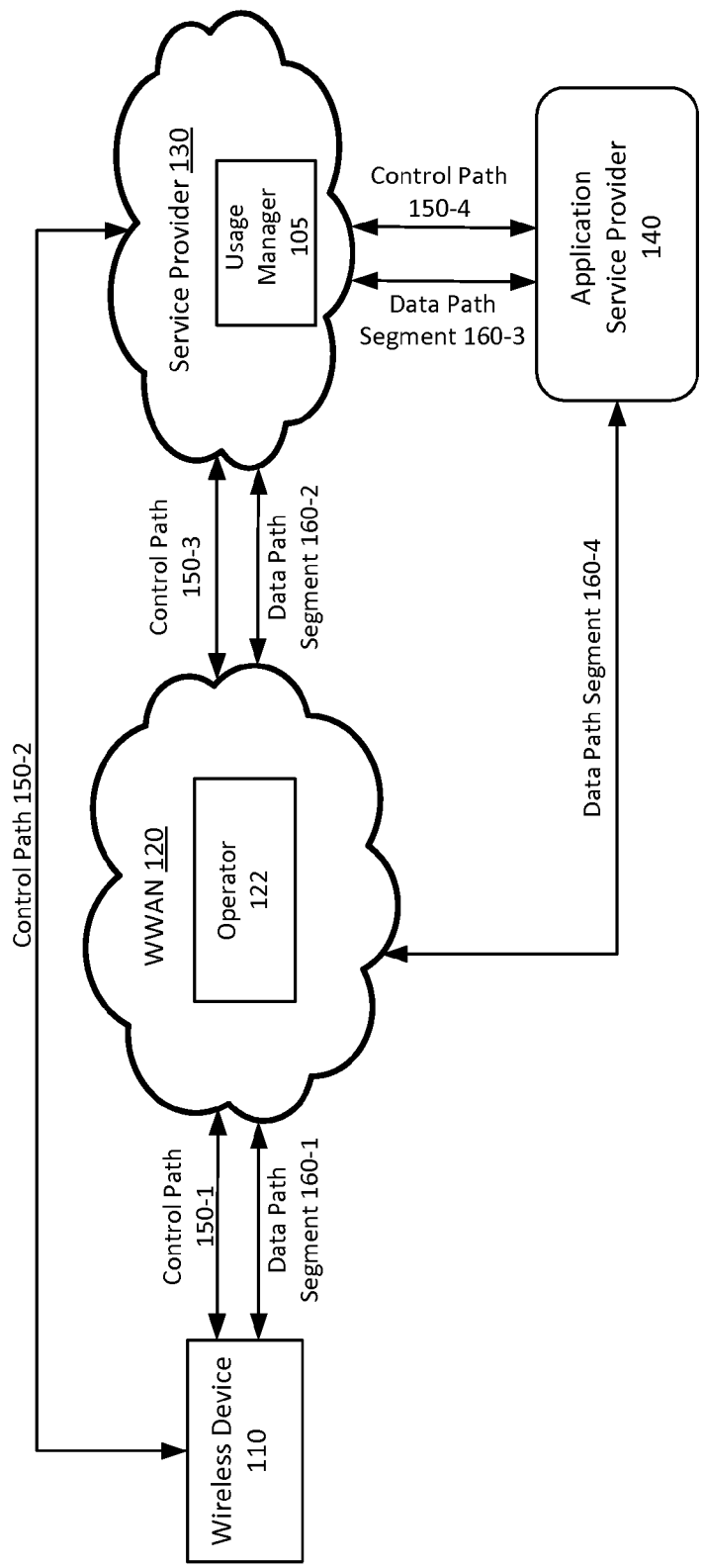
FIG. 1 illustrates an example of a first system.

Examples are generally directed to improvements for wireless wide area networks (WWANs) using wireless mobile telecommunication cellular or wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

By way of example and not limitation, various examples may be described with specific reference to various 3GPP LTE and LTE ADV standards, such as the 3GPP LTE Evolved UMTS Terrestrial Radio Access Network (E-UTRAN), Universal Terrestrial Radio Access (E-UTRA) and LTE ADV Radio Technology 36 Series of Technical Specifications (collectively "3GPP LTE Specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for WirelessMAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context As contemplated in the present disclosure, users of wireless devices may become frustrated by high costs, data usage limits or confusing payment schemes resulting from attempts to utilize the full computational power of their wireless devices via a WWAN. For example, a first user of a wireless device may only use certain applications sporadically during a given billing cycle and yet may be required to pay for a data plan that allows for more broadband data usage than is needed by this first user. A second user may use several applications or use a single application that may require a large amount of broadband data usage. The second user may quickly reach their data plan's capacity and have to pay a high penalty for additional broadband data usage. In either case, these users may become frustrated by data plans that lack flexibility in meeting each user's usage needs.

In some examples, WWAN operators may also find it difficult to build out their infrastructure to support a wide range of usage modules that vary not only between users but between groups of users associated with communities, cities, regions or even countries. In some instances, WWAN operators may build wireless mobile broadband capacity that may be at least partially unused in one community or region. Meanwhile, another region or community may lack enough wireless mobile broadband capacity to meet user demands. One possible solution is to allow wireless device users an ability to choose fractional wireless broadband usage when using a given application via a WWAN. Current broadband data plans lack the flexibility to allow for fractional wireless broadband usage when using a given application. It is with respect to these and other challenges that the examples described herein are needed.

In some examples, techniques are implemented for fractional wireless broadband usage. These techniques may include accessing, at a wireless device, a portal managed by a usage manager to establish an agreement an agreement with the usage manager for use of an application via a WWAN. The agreement may include policies associated with limits to data bandwidth utilized while the application is used via the WWAN. For these examples, access to the WWAN may be obtained through an operator of the WWAN (e.g., a mobile network operator (MNO)) to enable use of the application by presenting credentials for authenticating the wireless device to the operator of the WWAN and/or presenting credentials to the usage manager for authenticating the wireless device for use of the application. The application may then be executed according to the agreement. According to some examples, the application may be provided by an application service provider (ASP) having a service level agreement (SLA) with the usage manager and/or the operator of the WWAN for providing the application to the wireless device via the WWAN.

According to some examples, techniques for fractional wireless broadband usage may also include establishing an agreement enable use of an application via a WWAN. The agreement may include policies associated with limits to data bandwidth utilized while the application is accessed via the WWAN by the wireless device. For these examples, the techniques may also include receiving credentials to authenticate the wireless device for use of the application, enforcing policies included in the agreement while the application is used and billing for use of the application via the WWAN. The techniques may also include maintaining an SLA with an ASP that provides the application for use via the WWAN.

FIG. 1 illustrates an example of a first system. In some examples, as shown in FIG. 1, the first system includes a system 100. Also, as shown in FIG. 1, system 100 includes a wireless device 110, a WWAN 120, a service provider 130 and an application service provider 140. In some examples, elements of system 100 may be communicatively coupled via various control and/or data paths as shown in FIG. 1. For example, wireless device 110 may be communicatively coupled to WWAN 120, service provider 130 or application service provider 140 via one or more of control paths 150-1 to 150-4. These control paths may be for purposes of controlling usage of an application by a user of wireless device 110. Also, wireless device 110 may be communicatively coupled to application service provider 140 via a first data path that includes data path segments 160-1, 160-2 and 160-3 or via a second data path that includes data path segments 160-1 and 160-4. These data paths may be for purposes of exchanging data associated with usage of the application by the user of wireless device 110. The first and second data paths may be monitored to determine data bandwidth utilized while the user of wireless device 110 uses the application.

According to some examples, as shown in FIG. 1, WWAN 120 may include an operator 122. Operator 122 may include a mobile network operator (MNO) such as, for example, AT&T®, Verizon Wireless®, T-Mobile® or Sprint®. As described more below, operator 122 may control access to WWAN 120 via which a user of wireless device 110 may use an application provided by an ASP such as application service provider 140.

In some examples, as shown in FIG. 1, service provider 130 may include a usage manager 105. As described more below, usage manager 105 may include logic and/or features to establish an agreement with a user of a wireless device (e.g., wireless device 110) for the user to use an application via WWAN 120. Usage manager 105 may also authenticate credentials of users having previously established agreements with usage manager 105, enforce policies included in those agreements, bill users and maintain SLAs with ASPs such as application service provider 140.

According to some examples, a user of wireless device 110 may enter an agreement with usage manager 105 located with service provider 130. The agreement may be for the user of wireless device 110 to use an application via WWAN 120. For these examples, the agreement may include policies associated with limits to data bandwidth utilized while the user uses the application via WWAN 120. The application used may include, but is not limited to, a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

In some examples, the user of wireless device 110 may obtain access to WWAN 120 through operator 122 for the user to use the application via WWAN 120 by presenting credentials to operator 122 and/or usage manager 105. For these examples, as described more below, the credentials presented to operator 122 and/or usage manager 105 may be for authenticating the user.

According to some examples, at least a portion of the application may be executed at wireless device 110 according to the agreement established between usage manager 105 and the user of wireless device 110. For these examples, the application may be provided by application service provider 140. Also for these examples, application service provider 140 may have an SLA with usage manager 105 and/or operator 122. The SLA, for example, may include sharing revenue generated by the user's usage of the application provided by application service provider 140.

In some examples, usage manager 105 at service provider 130 may also establish and maintain an SLA with operator 122 at WWAN 120. For these examples, the SLA with operator 122 may enable usage manager 105 to arrange for wireless device 110 to access WWAN 120 to use an application according to an agreement between usage manager 105 and a user of wireless device 110. The SLA with operator 122 may also include sharing revenue generated by the user's usage of the application via WWAN 120.

Figure 2:
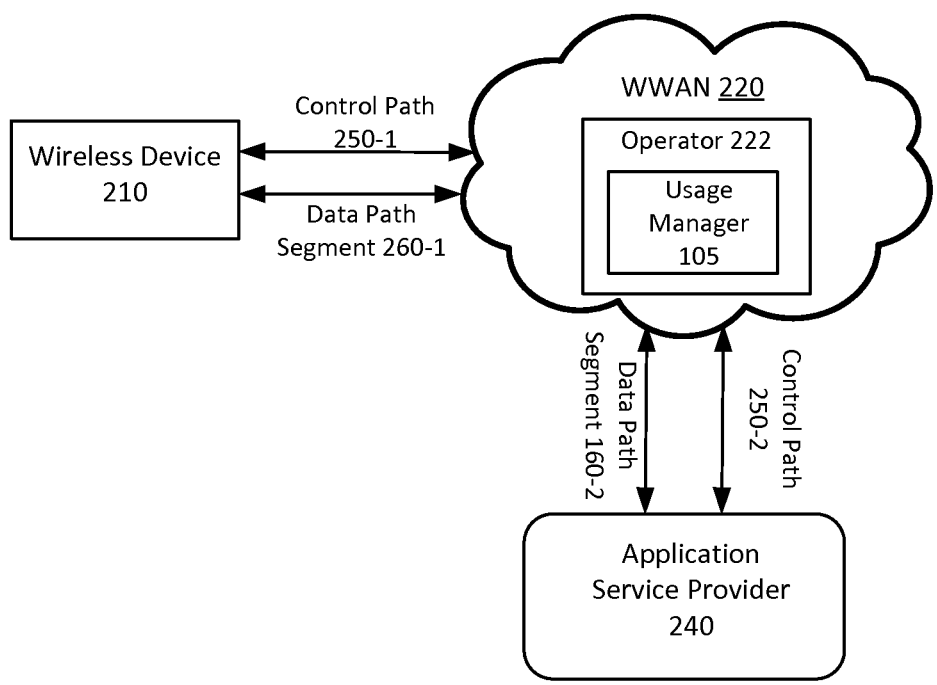
FIG. 2 illustrates an example of a second system.

FIG. 2 illustrates an example of a second system. According to some examples, as shown in FIG. 2, the second system includes a system 200. Also, as shown in FIG. 2, system 200 includes a wireless device 210, a WWAN 220 and an application service provider 240. In some examples, similar to FIG. 1, elements of system 200 may be communicatively coupled via various control and/or data paths as shown in FIG. 2. For example, wireless device 210 may be communicatively coupled to WWAN 220 or application service provider 240 via one or more of control paths 250-1 or 250-2. Also, wireless device 210 may be communicatively coupled to application service provider 240 via a data path that includes data path segments 260-1 and 260-2. The path that includes data path segments 260-1 and 260-2 may be monitored to determine data bandwidth utilized while the user of wireless device uses the application.

In some examples, similar to WWAN 120 in FIG. 1, WWAN 220 may include an operator 222. However, different from WWAN 120, WWAN 220 is shown in FIG. 2 as operator 222 also including a usage manager 105. For these examples, operator 222 and usage manager 105 may be part of a same operating entity. For example, as part of the same operating entity, operator 222 may control or allow access to a user of wireless device 210 to use an application provided by application 240 via WWAN 220. Also, as part of the same operating entity, usage manager 105 may manage one or more agreements with the user to use the application via WWAN 220. Usage manager 105 may also manage one or more SLAs with application service provider 240 to provide the application to the user via WWAN 220.

Figure 3:
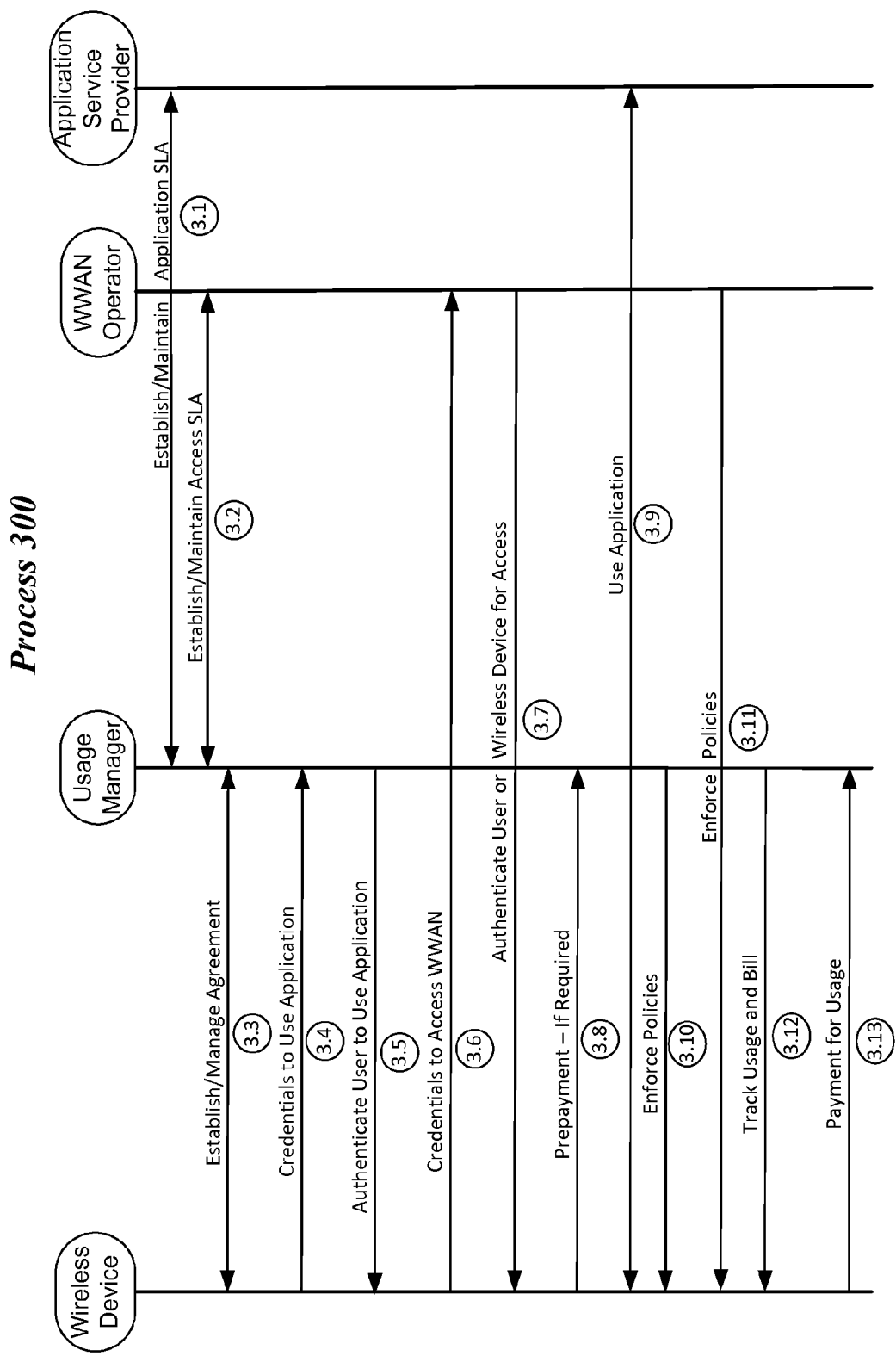
FIG. 3 illustrates an example process.

FIG. 3 illustrates an example of a process 300. In some examples, process 300 may be for implementing techniques for fractional wireless broadband usage. For these examples, elements of systems 100 or 200 as shown in FIGS. 1 and 2 may be used to illustrate example operations related to process 300. The described example operations are not limited to implementations using elements of systems 100 or 200 as shown in FIGS. 1 and 2.

Beginning at process 3.1 (Establish/Maintain Application SLA), logic and/or features at a usage manager may establish and maintain an application SLA with an ASP. In some examples, usage manager 105 may establish and maintain the application SLA with an ASP such as application service provider 140 or 240. For these examples, the SLA may include contract terms for these ASPs to provide an application to be used by users of wireless devices coupled to WWAN 120 or 220. The contract terms, for example, may include revenue sharing agreements for revenues associated with use of the application provided by a given ASP. Those revenues may result from, but are not limited to, a user purchasing the application or advertising revenues from embedded advertisements in the application displayed while the user uses the application. In some examples, the revenues may also be shared with the WWAN operator. The usage manager's maintenance of the application SLA may include, but is not limited to, occasionally authenticating ASPs to ensure a given ASP is still who they say they are and are not spoofing another ASP to gain unauthorized access to the WWAN and/or to users coupled to the WWAN.

Proceeding to process 3.2 (Establish/Maintain Access SLA), logic and/or features at the usage manager and a WWAN operator may establish an access SLA with a WWAN operator. Also, logic and/or features at the usage manager may maintain the access SLA. According to some examples, when the usage manager and the WWAN operator are separate operating entities such as described in FIG. 1, an SLA may be needed to establish contract terms for the usage manager to manage a user's use of an application via the WWAN.

In some examples, the usage manager may establish an SLA with the operator of WWAN. The usage manager and/or the operator may then maintain the SLA. In some examples, the SLA may include terms for costs associated with use of an application via the WWAN. These costs may be based on the amount of bandwidth the application is expected to consume while the application is used. The costs may also be associated with controlling access to the WWAN. The SLA may also include revenue sharing terms for revenues associated with the use of the application (e.g., advertising revenues).

Proceeding to process 3.3 (Establish/Manage Agreement), logic and/or features at the usage manager and a wireless device may establish an agreement via which an application may be used and/or accessed via the WWAN operated by the WWAN operator. Also, logic and/or features at the usage manager may manage the agreement. In some examples, the wireless device may include logic and/or features capable of executing a browser application displayed on a display for the wireless device to enable a user of the wireless device to view, modify or select terms of an agreement with the usage manager. For these examples, the agreement may be to use an application provided by an ASP such as application service provider 140. The application may be used via the WWAN.

In some examples, terms of the agreement, for example, may include policies associated with either unlimited data usage for a given purchase amount, data usage limits for another purchase amount, or an option to pay a given amount for each given unit of data used while the application is used. The policies may also be associated with the types of data permitted while using the application. For example, streaming high-definition video may be restricted or prohibited while using the application. In other examples, high bandwidth usage may be limited during peak demand periods for the WWAN (e.g., during business hours) but may be unrestricted during non-peak demand periods.

According to some examples, the usage manager may include logic and/or features to finalize or establish the agreement and then maintain the agreement. Maintenance of agreement may include monitoring the usage of the application and possibly updating or renewing the agreement as necessary.

Proceeding to process 3.4 (Credentials to Use Application), the wireless device may include logic and/or features arranged to present credentials for use of the application by the wireless device or the user to the usage manager. According to some examples, the wireless device may present credentials to the usage manager to use the application via the WWAN. For these examples, the credentials may include a digest access authentication process between a browser application executed at the wireless device and a web server associated with the usage manager. The digest access authentication process may include the wireless device presenting a session initiation protocol (SIP) digest such as described in Request for Comment (RFC) 3261, SIP: Session Initiation Protocol, Published in June 2002. In some other examples, credentials may include an X.509 certificate associated with public key infrastructure (PKI) and privilege management infrastructure (PMI) such as described in RFC 5280, Internet X.509 PKI Certificate and Certificate Revocation List (CRL) Profile, Published in May 2008. In some other examples, credentials may also include a password. Other examples of credentials are contemplated and this disclosure is not limited to the above-mentioned examples of credentials for a wireless device to present to a usage manager.

Proceeding to process 3.5 (Authenticate User to Use Application), the usage manager may include logic and/or features arranged to authenticate the wireless device or the user to use the application via the WWAN. In some examples, the usage manager may receive the credentials presented by the wireless device having an established agreement to use the application. For example, the wireless device may present credentials to the usage manager that includes one or more of an SIP digest, an X.509 certificate or a password. The usage manager may then authenticate the wireless device and/or the user for usage of the application based on the validity of the presented credentials. If the credentials are invalid, the usage manager may request additional credentials and/or may deny access to the application by the wireless device and/or the user.

Proceeding to process 3.6 (Credentials to Access WWAN), the wireless device may include logic and/or features arranged to present credentials to the WWAN operator for access to the WWAN. According to some examples, the wireless device may include logic and/or features capable of supporting a subscriber identity module (SIM). The SIM may include, but is not limited to, a universal SIM (USIM). For these examples, the USIM may enable the wireless device to present the credentials for authenticating the wireless device or the user to the WWAN operator for access to the WWAN. Other examples for presenting credentials to access a WWAN are contemplated and this disclosure is not limited to the above-mentioned example of presenting credentials for a wireless device or user to access a WWAN.

Proceeding to process 3.7 (Authenticate User or Wireless Device for Access), the WWAN operator may include logic and/or features arranged to receive the credentials presented by the wireless device and authenticate the user and/or the wireless device for access to the WWAN. In some examples, the wireless device may be wireless device 110 that includes a USIM provided by operator 122 of WWAN 120 (e.g., via a USIM card). For these examples, since the USIM was provided by operator 122, credentials presented via the USIM may be considered as valid and the wireless device or user may be authenticated for access to WWAN 120. If the USIM was not provided by operator 122 and/or was not recognized as an authorized USIM, the credentials presented may be deemed as invalid and access to WWAN 120 may be denied.

Proceeding to process 3.8 (Prepayment—If Required), the wireless device may include logic and/or features arranged to enable prepayment if required. According to some examples, the wireless device may be capable of receiving prepayment information from a user in order to prepay for use of the application via the WWAN according to an established agreement with the usage manager. For example, the user may be prompted to enter bank account information or credit card information via the browser application in order to provide funds to prepay for usage of the application.

Proceeding to process 3.9 (Use Application), the wireless device may include logic and/or features to enable execution of at least portions of the application on the wireless device. According to some examples, the wireless device may include logic and/or features capable of executing the application. At least portions of the application may be downloaded directly from an ASP such as application service provider 140 or 240, may be downloaded from a $3^{rd}$ party application vendor, or may be pre-loaded on the wireless device. The at least portions of the application may be executed according to the established agreement with the usage manager as mentioned above.

Proceeding to process 3.10 (Enforce Policies), the usage manager may include logic and/or features to enforce policies included in the agreement for use of the application via the WWAN. In some examples, the usage manager may enforce policies include in the established agreement. For these examples, enforcement of the policies may include filtering data traffic associated with usage of the application covered in the agreement. Filtering the data traffic may include blocking data traffic not covered by the agreement from being transmitted over a least a portion of the WWAN. For example, blocking data associated with streaming high definition video, blocking data having a destination not covered by the agreement or blocking data once data limits and/or prepayment data limits are exceeded. The usage manager may include logic and/or features capable of filtering data based on examination of data packet headers associated with usage of the application or filtering based on deep packet inspection of data packets associated with usage of the application.

According to some examples, the wireless device may include logic and/or features to assist the usage manager in enforcement of at least a portion of the policies. For these examples, the wireless device may be capable of filtering data traffic and blocking or not allowing data traffic to be transmitted or received if the data traffic is not covered by the agreement with the usage manager. In some examples, the data traffic may be filtered by either examining headers or deep packet inspection as mentioned above.

Proceeding to process 3.11 (Enforce Policies), the WWAN operator may also include logic and/or features to enforce policies included in the agreement for the user to use the application. According to some examples, the WWN operator may include logic and/or features to also enforce policies included in the agreement to use the application via the WWAN. Similar to enforcement by the usage manager, enforcement of the policies by the operator of the WWAN operator may include filtering data traffic by examination of packet headers are by deep packet inspection. Also, in some examples, the wireless device may also enforce at least a portion of the policies included in the agreement to included filtering data traffic associated with the application before it is transmitted or received at the wireless device.

Proceeding to process 3.12 (Track Usage and Bill), the usage manager may include logic and/or features to track usage of the application via the WWAN and then bill based on the usage. In some examples, the usage manager may track the amount of data associated with use of the application covered in the agreement. For these examples, the usage manager may track the usage by monitoring the amount of data being exchanged between the wireless device and the ASP providing the application. Based on the monitored amount of data, a bill may be generated and sent to the wireless device.

Proceeding to process 3.13 (Payment for Usage), the wireless device may include logic and/or features to enable the user of the wireless device to make a payment for usage of the application via the WWAN. According to some examples, the usage manager may have sent a bill for usage of the application. For these examples, the wireless device may present billing information associated with the bill. The billing information may be presented via the browser application capable of allowing the user to enter information to pay the bill. The information entered by the user may include bank account information, credit card information or other means for providing funds to pay the bill.

In some examples, various processes of process 300 may be repeated based on events such as updates to SLAs, agreements or authentication procedures/processes. Also, additional agreements may be established according to process 300 to enable use of additional applications via the WWAN that may be provided by the same or other ASPs.

Figure 4:
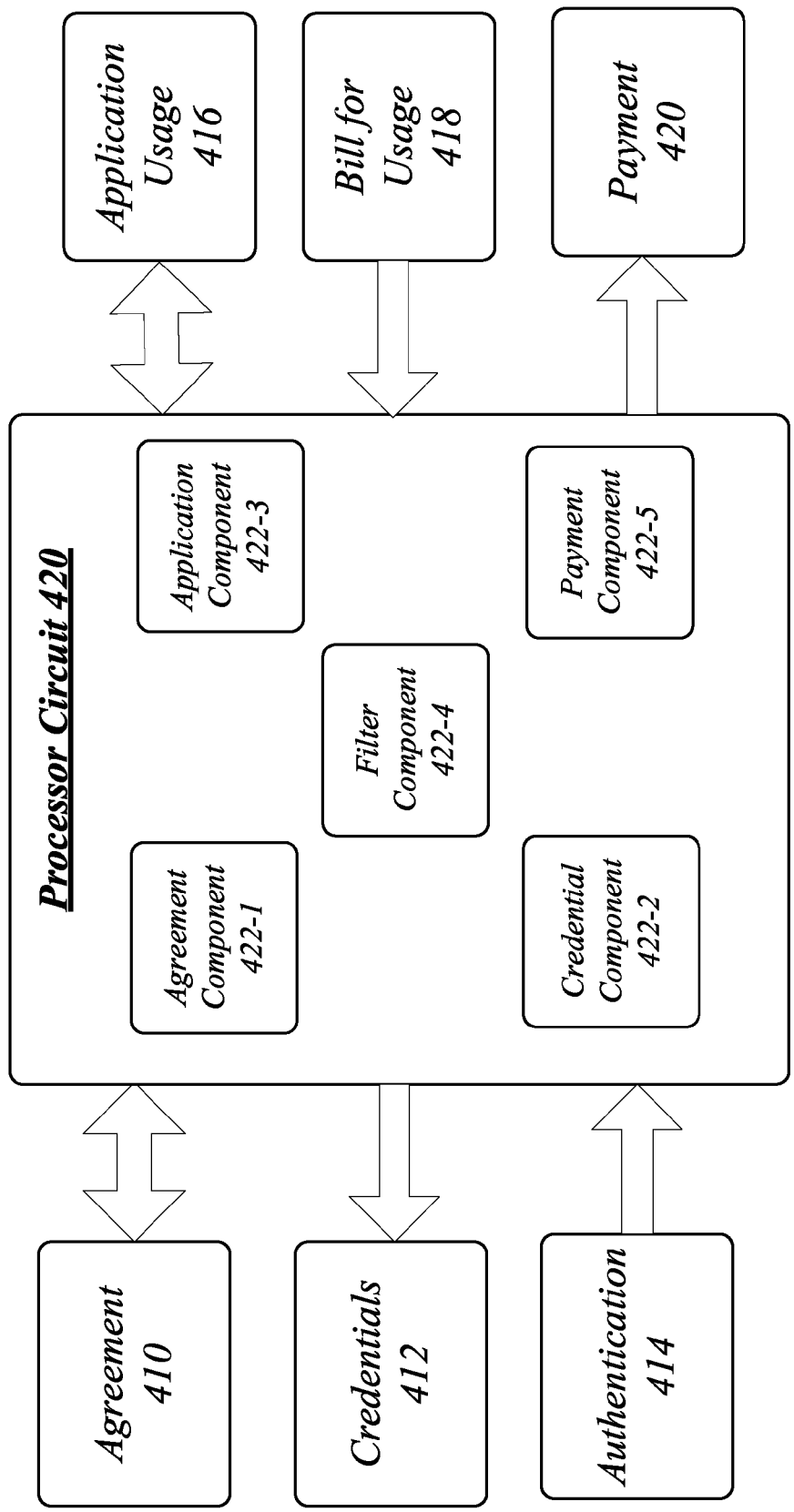
FIG. 4 illustrates an example block diagram for a first apparatus.

FIG. 4 illustrates a block diagram for a first apparatus. As shown in FIG. 4, the first apparatus includes an apparatus 400. Although apparatus 400 shown in FIG. 4 has a limited number of elements in a certain topology or configuration, it may be appreciated that apparatus 400 may include more or less elements in alternate configurations as desired for a given implementation.

The apparatus 400 may comprise a computer-implemented apparatus 400 having a processor circuit 420 arranged to execute one or more software components 422-a. It is worthy to note that "a" and "b" and "c" and similar designators as used herein are intended to be variables representing any positive integer. Thus, for example, if an implementation sets a value for a=5, then a complete set of software components 422-a may include components 422-1, 422-2, 422-3, 422-4 and 422-5. The embodiments are not limited in this context.

According to some examples, apparatus 400 may be part of a wireless device arranged to operate in compliance with one or more wireless broadband technologies such as those described in the 3GPP LTE Specifications. For example, apparatus 400 may be arranged or configured to communicatively couple to an LTE and/or LTE-A compliant wireless network. The examples are not limited in this context.

In some examples, as shown in FIG. 4, apparatus 400 includes processor circuit 420. Processor circuit 420 may be generally arranged to execute one or more software components 422-a. The processor circuit 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processor circuit 420.

According to some examples, apparatus 400 may include an agreement component 422-1. Agreement component 422-1 may be arranged for execution by processor circuit 420 to establish agreement 410 with a usage manager for the use of an application via a WWAN. For example, agreement component 422-1 may include a browser application executed at the wireless device. The browser application may enable a user of the wireless device to access a portal managed by the usage manager and then view and/or modify terms of agreement 410 to use the application via the WWAN. In some examples, agreement 410 may include policies associated with limits to data bandwidth utilized over the WWAN while the application is used.

In some examples, apparatus 400 may also include a credential component 422-2. Credential component 422-2 may be arranged for execution by processor circuit 420 to present credentials 412 to authenticate the user or the wireless device to an operator of the WWAN and/or present credentials 412 to the usage manager for use the application via the WWAN. In some examples, credential component 422-2 may include a USIM arranged to present at least a portion of credentials 412 to the operator of the WWAN for access to the WWAN. Credential component 422-2 may also be arranged to present at least a portion of credentials 412 to the usage manager to use the application. This at least portion of credentials 412 presented to the usage manager may include, but is not limited to, an X.509 certificate, a password or an SIP digest. If credentials 412 are deemed to be valid by the operator of the WWAN and/or the usage manager, an authentication 414 may be received to indicate the validity of credentials 412.

In some examples, apparatus 400 may also include an application component 422-3. Application component 422-3 may be arranged for execution by processor circuit 420 to execute at least portions of the application on the wireless device.

According to some examples, apparatus 400 may also include a filter component 422-4. Filter component 422-3 may be arranged for execution by processor circuit 420 to enforce the policies included in the agreement established with the usage manager for use of the application via the WWAN. For these examples, the policies may be enforced while the using the application and may include allowing data traffic associated application usage 416 to be transmitted from the wireless device based on the policies included in agreement 410.

In some examples, apparatus 400 may also include a payment component 422-5. Payment component 422-5 may be arranged for execution by processor circuit 420 to receive bill for usage 418. A bill for usage 418 may include billing information for the user using the application according to agreement 410. For these examples, payment component 422-5 may be arranged to provide or present the billing information to the user and also arranged to gather payment information for a payment 420 to cover the bill indicated in bill for usage 418. For example, the billing information included in bill for usage 418 may be presented via the browser application capable of allowing the user to enter information for the sending of payment 420. Payment 420 may include information entered by the user such as bank account information, credit card information or other means for providing funds to make a payment.

Various components of apparatus 400 and a device implementing apparatus 400 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
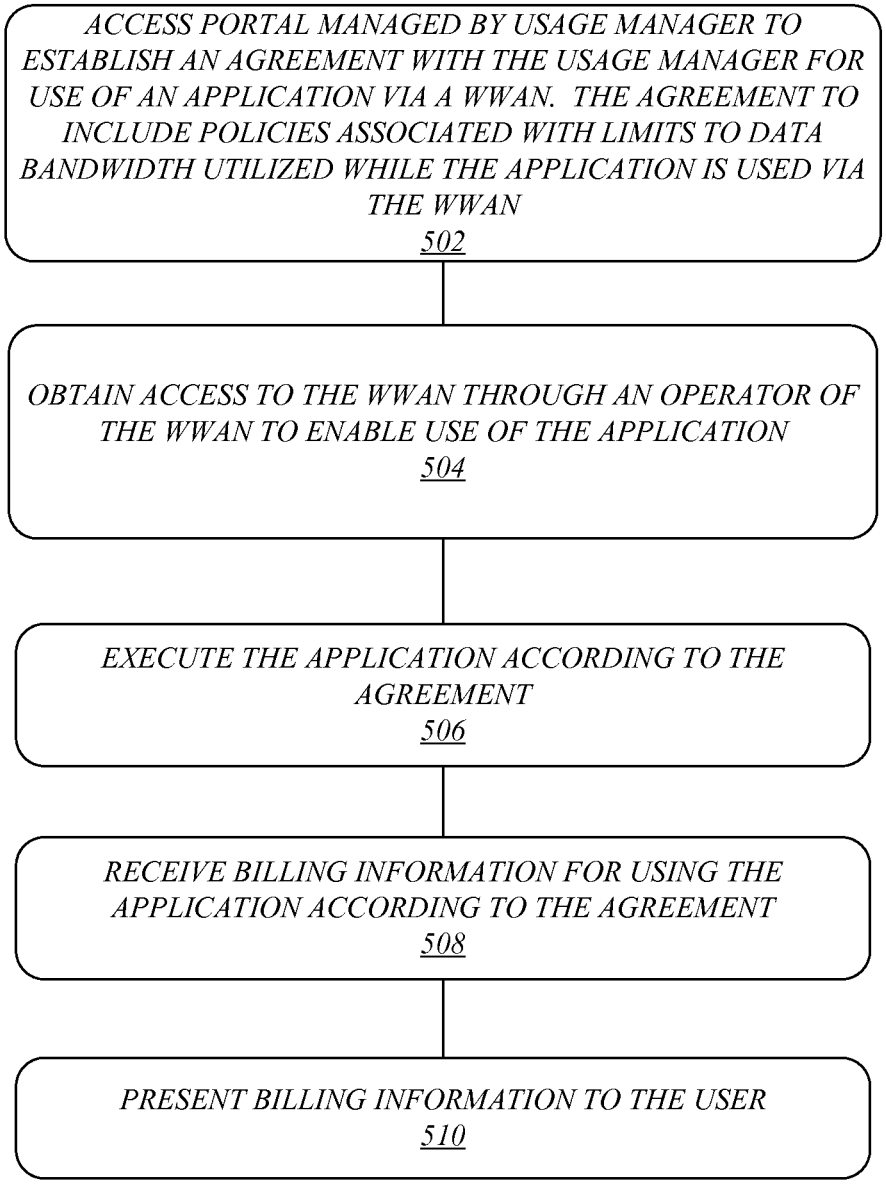
FIG. 5 illustrates an example of a first logic flow.

FIG. 5 illustrates an example of a first logic flow. As shown in FIG. 5, the first logic flow includes a logic flow 500. Logic flow 500 may be representative of some or all of the operations executed by one or more logic, features, or devices described herein, such as apparatus 400. More particularly, logic flow 500 may be implemented by agreement component 422-1, credential component 422-2, application component 422-3, filter component 422-4 or payment component 422-5.

In the illustrated example shown in FIG. 5, logic flow 500 may access a portal managed by a usage manager at block 502. In some examples, agreement component 422-1 of apparatus 400 (e.g., included in a wireless device) may include a browser application to establish an agreement with the usage manager. The agreement may be for use of an application via a WWAN. According to some examples, the agreement may include policies associated with limits to data bandwidth utilized while the application is used via the WWAN.

According to some examples, logic flow 500 at block 504 may obtain access to the WWAN through an operator of the WWAN to enable use of the application. For these examples, credential component 422-2 may present credentials for authenticating the wireless device or the user to the operator of the WWAN to obtain access to the WWAN. Credential component 422-2 may also present credentials to the usage manager for authenticating the wireless device or the user for use of the application via the WWAN.

According to some examples, logic flow 500 at block 506 may execute the application according to the agreement. For these examples, application component 422-3 may be arranged to execute at least a portion of the application on the wireless device. Filter component 422-4 may also filter data traffic associated with execution of the application in order to enforce at least some of the policies included in the agreement with the usage manager.

In some examples, logic flow 500 at block 508 may receive billing information for using the application according to the agreement and then present the received billing information to the user at block 510. For these examples, payment component 422-5 may be arranged or configured to receive and provide the billing information for viewing by the user and also enable the user to pay for usage of the application.

FIG. 6 illustrates an embodiment of a first storage medium. As shown in FIG. 6, the first storage medium includes a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
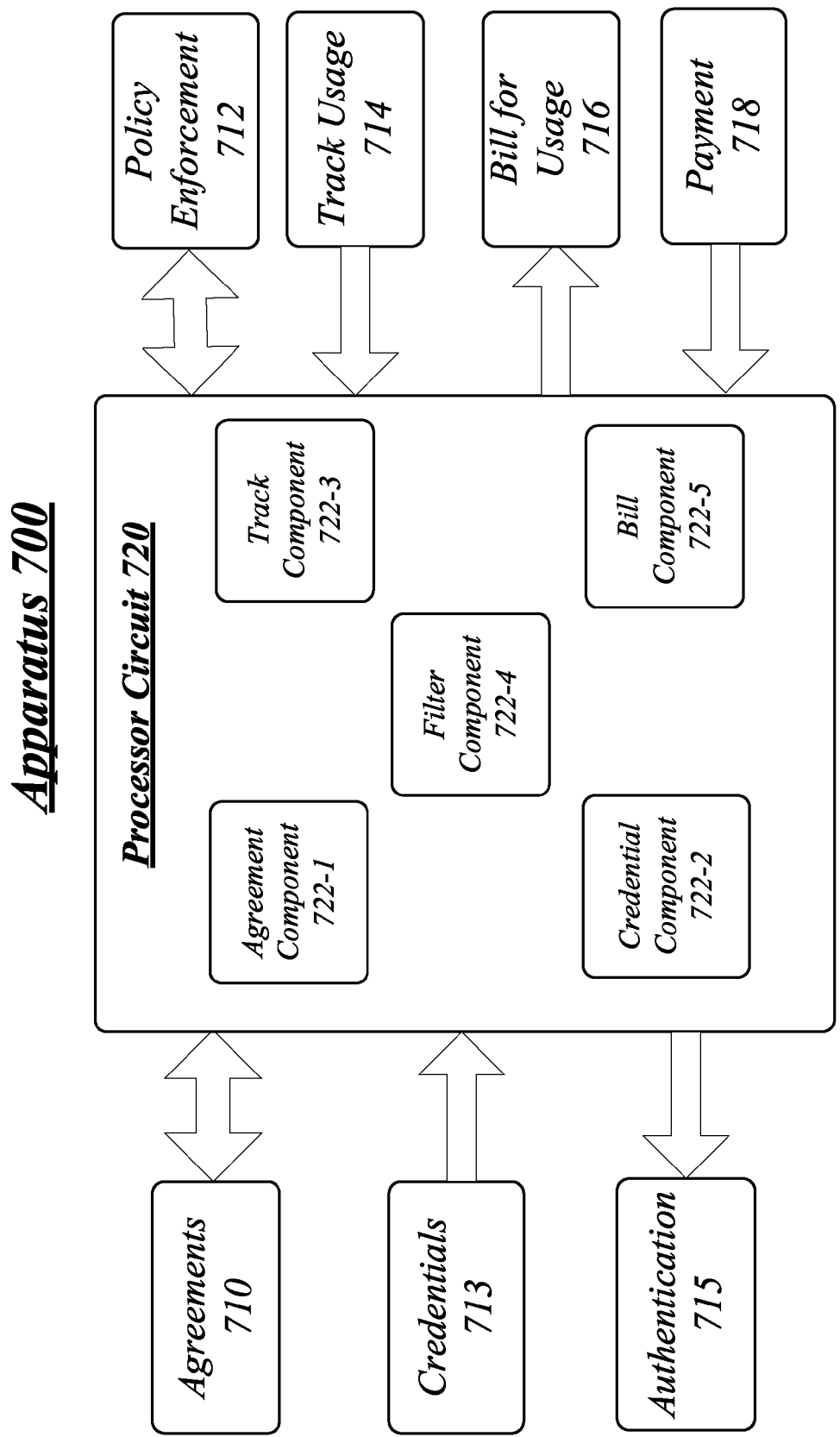
FIG. 7 illustrates an example block diagram for a second apparatus.

FIG. 7 illustrates an example block diagram for a second apparatus. As shown in FIG. 7, the second apparatus includes an apparatus 700. Although apparatus 700 shown in FIG. 7 has a limited number of elements in a certain topology or configuration, it may be appreciated that apparatus 700 may include more or less elements in alternate configurations as desired for a given implementation.

The apparatus 700 may comprise a computer-implemented apparatus 700 having a processor circuit 720 arranged to execute one or more software components 722-a. Similar to apparatus 400 for FIG. 4, "a" and "b" and "c" and similar designators maybe variables representing any positive integer.

According to some examples, apparatus 700 may be system equipment (e.g., located at or with WWAN 120 or 220 or located at or with a service provider 130), such as network equipment for a communications system or network compliant with one or more wireless broadband technologies such as those described in the 3GPP LTE Specifications. For example, apparatus 700 may be implemented as part of a base station or eNB for an LTE and/or LTE-A compliant wireless network if located at or with WWAN 120 or 220. Alternatively, apparatus 700 may be implemented as part of a server if located with service provider 130. The server may have communication interfaces capable of coupling to an LTE and/or LTE-A compliant wireless network. Although some examples are described with reference to a base station, eNB or server, examples may utilize any network equipment that couples to a communications system or network. The examples are not limited in this context.

In some examples, as shown in FIG. 7, apparatus 700 includes processor circuit 720. Processor circuit 720 may be generally arranged to execute one or more software components 722-a. The processor circuit 720 can be any of various commercially available processors to include, but not limited to, those previously mentioned for processing circuit 420 for apparatus 400. Dual microprocessors, multi-core processors, and other multi-processor architectures may also be employed as processor circuit 720.

According to some examples, apparatus 700 may include an agreement component 722-1. Agreement component 722-1 may be arranged for execution by processor circuit 720 to enter agreements 710 for use applications via a WWAN. Agreement component 722-1 may also be arranged to enter agreements such as SLAs with either an operator of the WWAN or one or more ASPs that provide the applications. For example, agreement component 722-1 may include a portal via which browsers applications executed at the wireless devices may enable users of these wireless devices to enter into agreements 710. In some examples, agreements 710 may include policies associated with limits to data bandwidth utilized over the WWAN while the applications are used. Agreements 710 associated with SLAs may include revenue sharing terms for revenue generated during use of the applications.

In some examples, apparatus 700 may also include a credential component 722-2. Credential component 722-2 may be arranged for execution by processor circuit 720 to receive credentials 712 to authenticate one or more wireless devices or users of these wireless devices. In some examples, credential component 722-2 may receive credentials from USIMs located at the one or more wireless devices and provide an authentication 715 if the credentials are found to be valid. For these examples, authentication 715 may be for the one or more wireless devices to gain access to the WWAN. Credential component 722-2 may also be arranged to receive credentials 712 that may include, but are not limited to, an X.509 certificate, a password or an SIP digest. If these credentials included in credentials 712 are deemed to be valid by the operator of the WWAN and/or the usage manager, an authentication 715 may be sent to those wireless devices deemed to have sent valid credentials and authenticated users may be able to use applications via the WWAN.

In some examples, apparatus 700 may also include track component 722-3. Track component 722-3 may be arranged for execution by processor circuit 720 to track usage of an application. Track component 722-3 may be arranged to directly track usage or may receive at least some accounting information from elements such as the ASPs that provide the application for use via the WWAN. The at least some accounting information is shown in FIG. 7 as track usage 714.

According to some examples, apparatus 700 may also include a filter component 722-4. Filter component 722-4 may be arranged for execution by processor circuit 720 to enforce the policies included in the agreement established to use the applications via the WWAN. For these examples, the policies may be enforced while the application is being used and may include allowing data traffic associated with application usage to be transmitted over at least a portion of the WWAN based on the policies included in agreements 710.

In some examples, apparatus 700 may also include a bill component 722-5. Bill component 722-5 may be arranged for execution by processor circuit 720 to send bill for usage 716 to the one or more users or wireless devices. A bill for usage 716 may include billing information for the application usage according to agreements 710. For these examples, bill component 722-5 may be arranged to receive payment information from the one or more users for a payment 718 to cover the bill indicated in bill for usage 716.

Various components of apparatus 700 and a device implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 8:
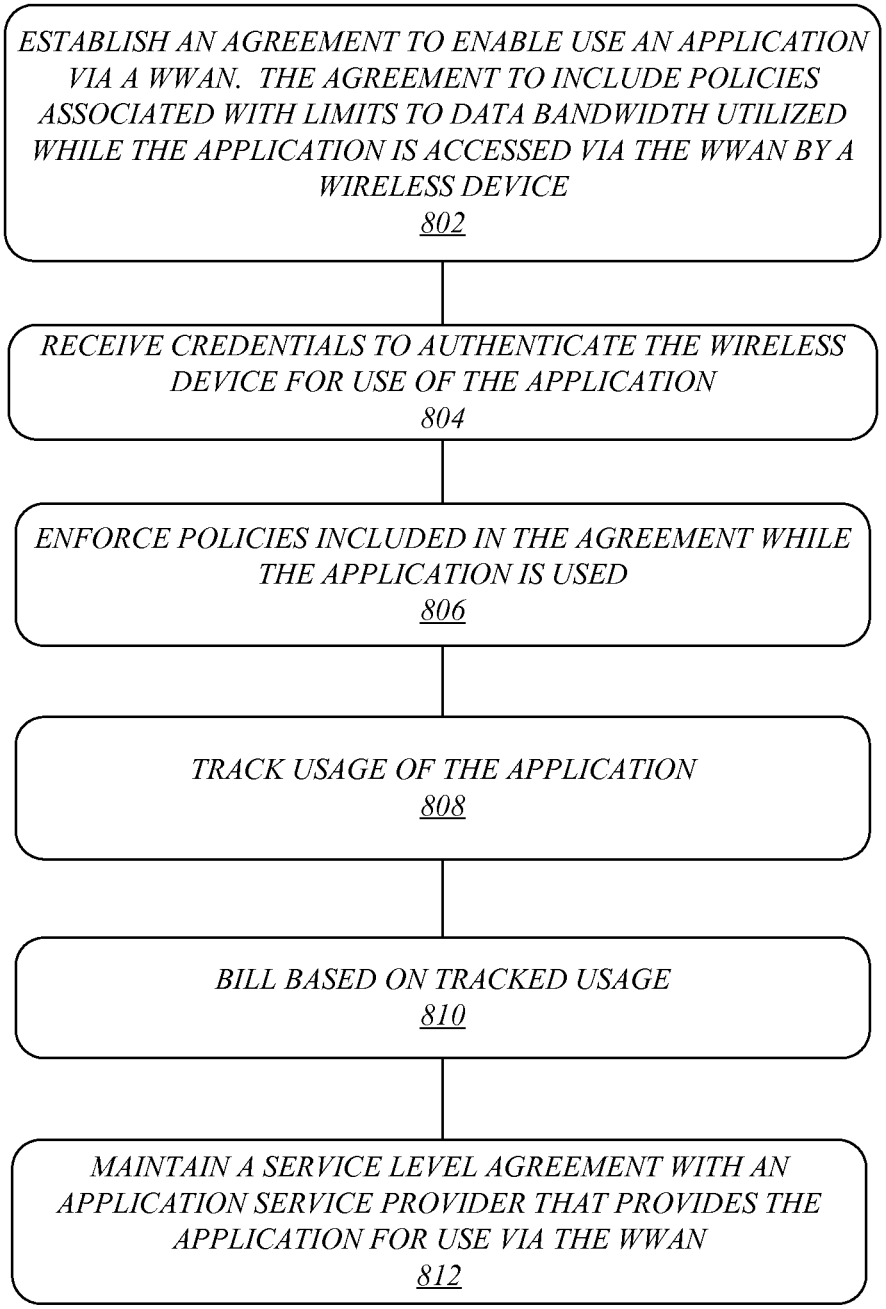
FIG. 8 illustrates an example of a second logic flow.

FIG. 8 illustrates an example of a second logic flow. As shown in FIG. 8, the second logic flow includes a logic flow 800. Logic flow 800 may be representative of some or all of the operations executed by one or more logic, features, or devices described herein, such as apparatus 700. More particularly, logic flow 800 may be implemented by agreement component 722-1, credential component 722-2, track component 722-3, filter component 722-4 or bill component 722-5.

In the illustrated example shown in FIG. 8, logic flow 800 may establish an agreement to enable use of an application via a WWAN at block 802. In some examples agreement component 722-1 of apparatus 700 (e.g., included with a usage manager) may include a portal to enable establishment of the agreement with a wireless device to use the application via the WWAN. For these examples the agreement may include policies associated with limits to data bandwidth utilized while the application is accessed via the WWAN by the wireless device.

According to some examples, logic flow 800 at block 804 may receive credentials to authenticate the wireless device for use of the application. For these examples, credential component 722-2 may receive the credentials and authenticate the wireless device for use of the application based on the received credentials.

In some examples, logic flow 800 at block 806 may track usage of the. For these examples, track component 722-3 may be arranged to track the usage of the application.

According to some examples, logic flow 800 may bill based on the tracked usage at block 810. For these examples, bill component 722-5 may send a bill to a user of the wireless device based on the tracked usage.

In some examples, logic flow 800 may maintain an SLA at block 812. For these examples, agreement component 722-1 may be arranged to maintain the SLA with an ASP that provides the application for use via the WWAN.

FIG. 9 illustrates an embodiment of a second storage medium. As shown in FIG. 9, the second storage medium includes a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
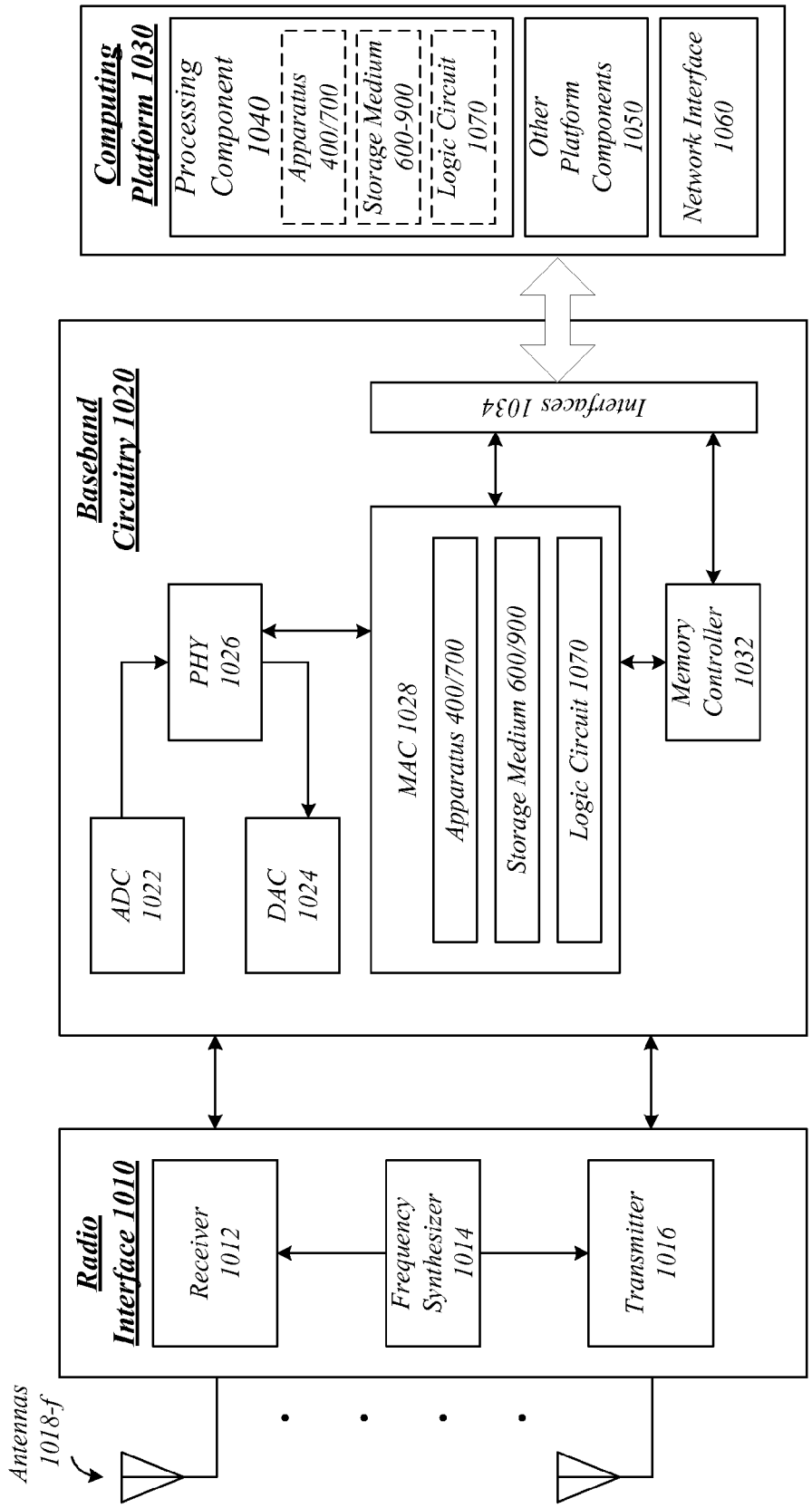
FIG. 10 illustrates an example of a device.

FIG. 10 illustrates an embodiment of a device 1000 for use in a broadband wireless access network. Device 1000 may implement, for example, apparatus 400 or 700, storage medium 600 or 900 and/or a logic circuit 1070. The logic circuit 1070 may include physical circuits to perform operations described for apparatus 400 or apparatus 700. As shown in FIG. 10, device 1000 may include a radio interface 1010, baseband circuitry 1020, and computing platform 1030, although examples are not limited to this configuration.

The device 1000 may implement some or all of the structure and/or operations for apparatus 400 or 700, storage medium 600 or 900 and/or logic circuit 1070 in a single computing entity, such as entirely within a single device. Alternatively, the device 1000 may distribute portions of the structure and/or operations for apparatus 400 or 700, storage medium 600 or 900 and/or logic circuit 1070 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-$f$. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for apparatus 400 or apparatus 700, storage medium 600 or storage medium 900, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits (e.g., processor circuit 720), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more 3GPP LTE or LTE-A specifications or standards Device 1000 may be, for example, user equipment, a computer, a personal computer (PC), a desktop computer, a laptop computer, a notebook computer, a netbook computer, a server, a server array or server farm, a web server, a network server, an Internet server, a work station, a mini-computer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 802.16 Standards for WWANs and/or other broadband wireless networks, cited herein, although the examples are not limited in this respect.

Embodiments of device 1000 may be implemented using single input single output (SISO) architectures. However, certain implementations may include multiple antennas (e.g., antennas 1018-$f$) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
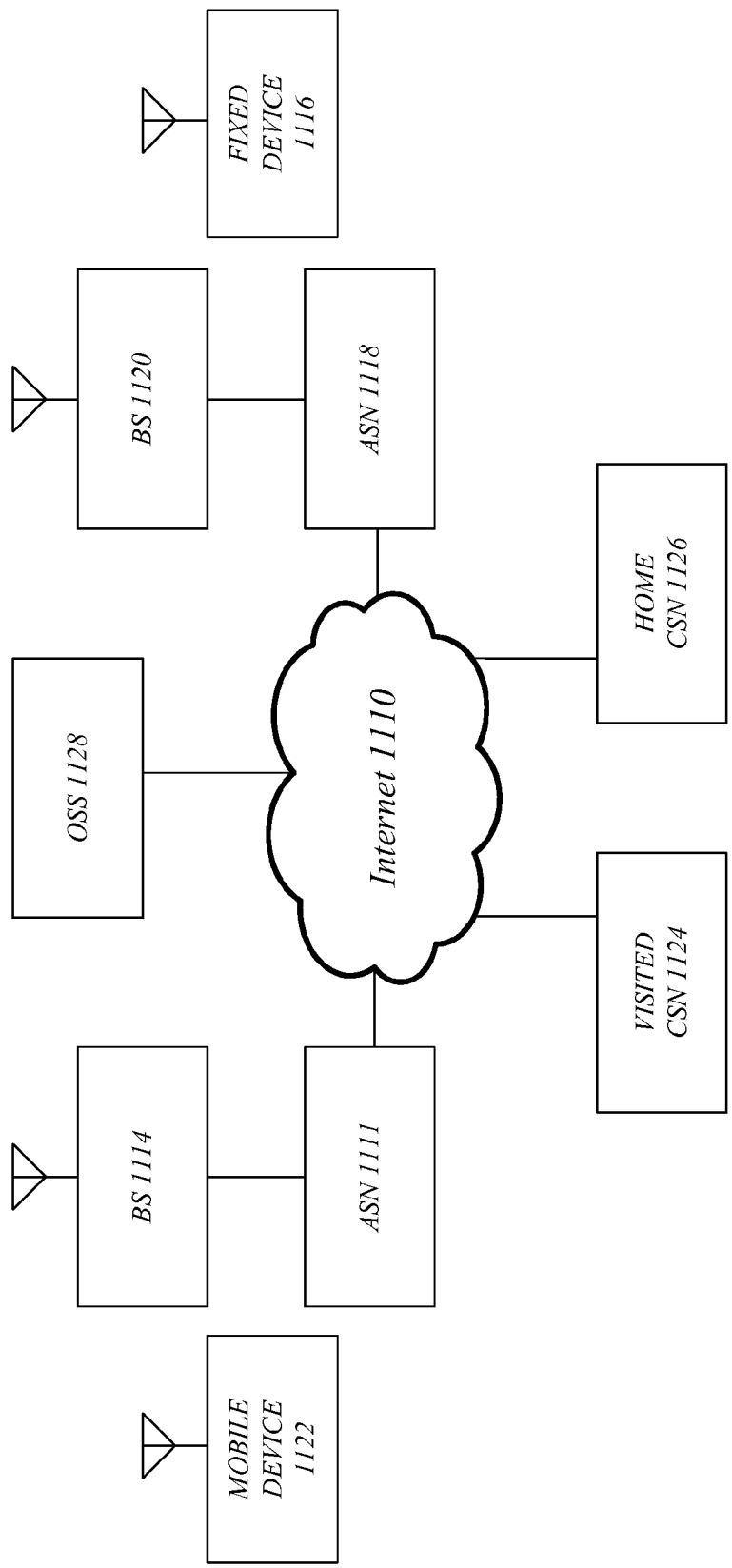
FIG. 11 illustrates an example of a broadband wireless access system.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 1100, access service networks (ASN) 1114, 1118 are capable of coupling with base stations (BS) 1114, 1120 (or eNBs), respectively, to provide wireless communication between one or more fixed devices 1116 and internet 1110, or one or more mobile devices 1122 and Internet 1110. One example of a fixed device 1116 and a mobile device 1122 is UE 105 or UE 205, with the fixed device 1116 comprising a stationary version of UE 105 or UE 205 and the mobile device 1122 comprising a mobile version of UE 105 or UE 205. ASN 1112 may implement profiles that are capable of defining the mapping of network functions to one or more physical entities on broadband wireless access system 1100. Base stations 1114, 1120 (or eNBs) may comprise radio equipment to provide RF communication with fixed device 1116 and mobile device 1122, such as described with reference to device 1100, and may comprise, for example, the PHY, MAC, RLC or PDCP layer equipment in compliance with a 3GPP LTE Specification or an IEEE 802.16 Standard. Base stations 1114, 1120 (or eNBs) may further comprise an IP backplane to couple to Internet 1110 via ASN 1112, 1118, respectively, although the scope of the claimed subject matter is not limited in these respects.

Broadband wireless access system 1100 may further comprise a visited connectivity service network (CSN) 1124 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1124 or home CSN 1126, and the scope of the claimed subject matter is not limited in these respects. Visited CSN 1124 may be referred to as a visited CSN in the case where visited CSN 1124 is not part of the regular service provider of fixed device 1116 or mobile device 1122, for example where fixed 1116 or mobile device 1122 is roaming away from their respective home CSN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122.

Fixed device 1116 may be located anywhere within range of one or both base stations 1114, 1120, such as in or near a home or business to provide home or business customer broadband access to Internet 1110 via base stations 1114, 1120 and ASN 1112, 1118, respectively, and home CSN 1126. It is worthy to note that although fixed device 1116 is generally disposed in a stationary location, it may be moved to different locations as needed. Mobile device 1122 may be utilized at one or more locations if mobile device 1122 is within range of one or both base stations 1114, 1120, for example.

In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, first methods may include accessing, at a wireless device, a portal managed by a usage manager to establish an agreement with the usage manager for use of an application via a wireless wide area network (WWAN). The agreement may include policies associated with limits to data bandwidth utilized while the application is used via the WWAN. For these examples, access may be obtained to the WWAN through an operator of the WWAN to enable use of the application. Also for these examples, the application may be executed according to the agreement. The application may be provided by an application service provider having a service level agreement with the usage manager and/or the operator of the WWAN for providing the application to the wireless device via the WWAN.

According to some examples, the first methods may also include receiving billing information using the application according to the agreement and presenting the billing information on the wireless device.

In some examples, the first methods may also include receiving prepayment information for using the application according to the agreement and sending the prepayment information to the usage manager.

According to some examples, the first methods may also include receiving an indication that the prepaid usage of the application has been exceeded and obtaining additional payment information to pay for additional use of the application according to the agreement.

In some examples, the first methods may also include accessing the portal managed by the usage manager by accessing the portal through a browser application executed by the wireless device. For these examples, the browser application may be arranged to enable the viewing and/or modifying terms of the agreement to use the application. The browser may also enable viewing and/or paying a bill associated with using the application via the WWAN.

According to some examples, obtaining access to the WWAN through an operator of the WWAN to enable use of the application may include obtaining access by presenting credentials for authenticating the wireless device to the operator of the WWAN and/or presenting credentials to the usage manager for authenticating the wireless device for use of the application.

In some examples, the first methods may also include authenticating a user of the wireless device to the operator of the WWAN. Authenticating the user may include authenticating the user via a SIM at the wireless device that includes a USIM.

According to some examples, the first methods may also include presenting credentials to the usage manager via presenting credentials that include one or more of an X.509 certificate, a password, or a SIP digest.

In some examples, the first methods may also include the usage manager being a service provider to manage the agreement and maintain the service level agreement with the application service provider.

According to some examples, the first methods may also include the usage manager and the operator of the WWAN arranged as part of a same operating entity to manage the agreement, allow access to the WWAN and maintain the service level agreement with the application service provider.

In some examples, the first methods may also include the application as a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

According to some examples, at least one machine readable medium comprising a plurality of instructions that in response to being executed on a computing device cause the computing device to carry out the example first methods as mentioned above.

In some examples a communications device may be arranged to perform the example first methods as mentioned above.

In some examples an apparatus or device may include means for performing the example first methods as mentioned above.

In some examples, second methods may include establishing an agreement to enable use of an application via a WWAN. The agreement may include policies associated with limits to data bandwidth utilized while the application is accessed via the WWAN by a wireless device. For these examples, credentials may be received to authenticate the wireless device for use of the application. Also for these examples, policies included in the agreement may be enforced while the application is used. Use of the application via the WWAN may then be billed. Also for these examples, an SLA may be maintained with an application service provider that provides the application to the user via the WWAN.

According to some examples, the second methods may also include receiving additional credentials to authenticate the wireless device to allow access to the WWAN. For these examples, the additional credentials may be received from a SIM at the wireless device that includes a USIM.

In some examples, the second methods may also include an operator of the WWAN establishing the agreement, receiving the credentials to authenticate the wireless device to allow access to the WWAN, enforcing the policies included in the agreement, billing a user of the wireless device and maintaining the service level agreement with the application service provider.

In some examples, the second methods may also include a service provider establishing the agreement, receiving the credentials to authenticate the wireless device, enforcing the policies included in the agreement, billing a user of the wireless device and maintaining the service level agreement with the application service provider.

According to some examples, the second methods may also include receiving credentials to authenticate the wireless device for use of the application by receiving credentials that include one or more of an X.509 certificate, a password, or a session initiation protocol (SIP) digest.

According to some examples, the second methods may also include enforcing the policies by filtering data traffic associated with usage of the application such that data traffic not covered by the agreement is blocked or not allowed to be transmitted over at least a portion of the WWAN.

In some examples, the second methods may also include filtering data traffic to include at least one of causing data traffic associated with usage of the application to be filtered at the wireless device or to be filtered by an operator of the WWAN.

According to some examples, the second methods may also include filtering data traffic by causing data traffic associated with usage of the application to be filtered by a service provider that manages the agreement, authenticates the wireless device, bills a user of the wireless device and maintains the service level agreement with the application service provider.

In some examples, the second methods may also include filtering data traffic associated with usage of the application by filtering based on examination of a data packet header associated with usage of the application or by filtering based on deep packet inspection of a data packet associated with usage of the application.

According to some examples, the second methods may also include billing for use of the application via the WWAN by requiring a user of the wireless device to prepay for a given amount of usage of the application or indicating to the user an amount of tracked usage of the application and a charge for the amount of tracked usage of the application.

In some examples, the second methods may also include the service level agreement including sharing revenue with the application service provider for revenue generated by the wireless device's usage of the application.

According to some examples, the second methods may also include the application as a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

According to some examples, at least one machine readable medium comprising a plurality of instructions that in response to being executed on a computing device cause the computing device to carry out the example second methods as mentioned above.

In some examples a communications device may be arranged to perform the example second methods as mentioned above.

In some examples an apparatus or device may include means for performing the example second methods as mentioned above.

According to some examples, an example apparatus may include a processor circuit and a an agreement component arranged for execution by the processor circuit to access a portal managed by a usage manager to establish an agreement to use an application via a WWAN coupled to the wireless device. The agreement may include policies associated with limits to data bandwidth utilized while the application is used via the WWAN. The example apparatus may also include a credential component arranged for execution by the processor circuit to present credentials for authenticating the wireless device to an operator of the WWAN for access of the wireless device to the WWAN and/or present credentials to the usage manager for use of the application via the WWAN. The example apparatus may also include an application component arranged for execution by the processor circuit to execute at least portions of the application on the wireless device according to the agreement.

In some examples, the example first apparatus may also include a filter component arranged for execution by the processor circuit to enforce the policies included in the agreement while the application is being used. For these examples, enforcement may include allowing data traffic associated with usage of the application to be transmitted from the wireless device based on the policies included in the agreement.

According to some examples, the example first apparatus may also include a payment component arranged for execution by the processor circuit to receive billing information for using the application according to the agreement and presenting the billing information to a user of the wireless device. For these examples, the payment component may also be arranged to gather payment information from the user to enable the user to make a payment based on the billing information.

In some examples for the example first apparatus, the application may be provided by an application service provider having a service level agreement with the usage manager and/or the operator of the WWAN that includes terms for providing the application for use via the WWAN.

According to some examples for the example first apparatus, the agreement component may include a browser application to access the portal managed by the usage manager and enable a user of the wireless device to view and/or modify terms of the agreement.

In some examples for the example first apparatus, the credential component to include a USIM to present credentials for authenticating the wireless device to the operator of the WWAN.

According to some examples for the example first apparatus, the credential component also arranged to present credentials to the usage manager for use of the application via the WWAN by presenting credentials that include one or more of an X.509 certificate, a password, or a SIP digest.

In some examples for the example first apparatus, the application to include a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   accessing, at a wireless device, a portal managed by a usage manager to establish an agreement with the usage manager for use of an application via a wireless wide area network (WWAN), the agreement to include policies associated with limits to data bandwidth utilized while the application is used via the WWAN, the application provided by an application service provider having an application service level agreement (SLA) with the usage manager for providing the application to the wireless device via the WWAN;
   obtaining access to the WWAN through an operator of the WWAN to enable use of the application by presenting first credentials for authenticating the wireless device to the operator of the WWAN via a universal subscriber identity module (USIM) at the wireless device and presenting second credentials to the usage manager for authenticating the wireless device for use of the application, the second credentials comprising one or both of an X.509 certificate and a session initiation protocol (SIP) digest, the operator of the WWAN having an access SLA with the usage manager; and
   executing the application according to the agreement.

2. The method of claim 1, comprising:
   receiving billing information for using the application according to the agreement; and
   presenting payment information on the wireless device.

3. The method of claim 1, comprising:
   receiving prepayment information for using the application according to the agreement; and
   sending the prepayment information to the usage manager.

4. The method of claim 3, comprising:
   receiving an indication that the prepaid usage of the application has been exceeded; and
   obtaining additional payment information to pay for additional use of the application according to the agreement.

5. The method of claim 1, accessing the portal managed by the usage manager comprising accessing the portal through a browser application executed by the wireless device, the browser application arranged to enable viewing and/or modifying of the terms of the agreement to use the application.

6. The method of claim 5, comprising the browser application arranged to enable viewing and/or paying a bill associated with using the application via the WWAN.

7. The method of claim 1, comprising the application to include a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

8. A method comprising:
   establishing an agreement to enable use of an application by a wireless device via a wireless wide area network (WWAN), the agreement to include policies associated with limits to data bandwidth utilized while the application is accessed via the WWAN by the wireless device, the wireless device authenticated for access to the WWAN based on first credentials presented by a universal subscriber identity module (USIM) of the wireless device;
   authenticating the wireless device for use of the application based on second credentials comprising one or both of an X.509 certificate and a session initiation protocol (SIP) digest;
   enforcing the policies included in the agreement while the application is used;
   billing for use of the application via the WWAN;

maintaining an application service level agreement (SLA) with an application service provider that provides the application for use via the WWAN; and maintaining an access SLA with an operator of the WWAN.

9. The method of claim 8, enforcing the policies comprising filtering data traffic associated with usage of the application such that data traffic not covered by the agreement is blocked or not allowed to be transmitted over at least a portion of the WWAN.

10. The method of claim 9, filtering data traffic comprising at least one of causing data traffic associated with usage of the application to be filtered at the wireless device or to be filtered by the operator of the WWAN.

11. The method of claim 9, filtering data traffic associated with usage of the application comprising filtering based on examination of a data packet header associated with usage of the application or filtering based on deep packet inspection of a data packet associated with usage of the application.

12. The method of claim 8, billing for use of the application via the WWAN comprising requiring a user of the wireless device to prepay for a given amount of usage of the application or indicating to the user an amount of tracked usage of the application and a charge for the amount of tracked usage of the application.

13. The method of claim 8, the application SLA comprising sharing revenue with the application service provider for revenue generated by the wireless device's usage of the application.

14. The method of claim 8, comprising the application to include a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

15. An apparatus comprising:
a processor circuit for a wireless device;
an agreement component arranged for execution by the processor circuit to access a portal managed by a usage manager to establish an agreement to use an application via a wireless wide area network (WWAN) coupled to the wireless device, the agreement to include policies associated with limits to data bandwidth utilized while the application is used via the WWAN, the application provided by an application service provider having an application service level agreement (SLA) with the usage manager for providing the application to the wireless device via the WWAN;
a credential component arranged for execution by the processor circuit to obtain access to the WWAN by presenting first credentials for authenticating the wireless device to an operator of the WWAN via a universal subscriber identity module (USIM) and present second credentials to the usage manager for authenticating the wireless device for use of the application via the WWAN, the second credentials comprising one or both of an X.509 certificate and a session initiation protocol (SIP) digest, the operator of the WWAN having an access SLA with the usage manager; and
an application component arranged for execution by the processor circuit to execute at least portions of the application on the wireless device according to the agreement.

16. The apparatus of claim 15, comprising:
a filter component arranged for execution by the processor circuit to enforce the policies included in the agreement while the application is being used, enforcement to include allowing data traffic associated with usage of the application to be transmitted from the wireless device based on the policies included in the agreement.

17. The apparatus of claim 15, comprising:
a payment component arranged for execution by the processor circuit to receive billing information for using the application according to the agreement and presenting the billing information to a user of the wireless device, the payment component also arranged to gather payment information from the user to enable the user to make a payment based on the billing information.

18. The apparatus of claim 15, the application SLA to include terms for providing the application for use via the WWAN.

19. The apparatus of claim 15, comprising the agreement component to include a browser application to access the portal managed by the usage manager and enable a user of the wireless device to view and/or modify terms of the agreement.

20. The apparatus of claim 15, comprising the application to include a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

21. At least one non-transitory machine-readable medium comprising a plurality of instructions that in response to being executed on a system cause the system to:
establish an agreement to enable use of an application by a wireless device via a wireless wide area network (WWAN), the agreement to include policies associated with limits to data bandwidth utilized while the application is accessed via the WWAN by the wireless device, the wireless device authenticated for access to the WWAN based on first credentials presented by a universal subscriber identity module (USIM) of the wireless device;
authenticate the wireless device for use of the application based on second credentials comprising one or both of an X.509 certificate and a session initiation protocol (SIP) digest;
enforce the policies included in the agreement while the application is used;
track usage of the application by the wireless device;
bill for use of the application based on the tracked usage;
maintain an application service level agreement (SLA) with an application service provider that provides the application to for use via the WWAN; and
maintain an access SLA with an operator of the WWAN.

22. The at least one non-transitory machine-readable medium of claim 21, enforce the policies included in the agreement comprises the system to filter data traffic associated with usage of the application such that data traffic not covered by the agreement is blocked or not allowed to be transmitted over at least a portion of the WWAN.

23. The at least one non-transitory machine-readable medium of claim 22, comprising the system to filter data traffic associated with usage of the application to include the system to filter based on examination of a data packet header associated with usage of the application or the system to filter based on deep packet inspection of a data packet associated with usage of the application.

24. The at least one non-transitory machine-readable medium of claim 21, comprising the application to include a social media application, an image sharing application, a video sharing application, a streaming audio application, a streaming video application, an electronic mail (e-mail) application, a financial information application, a stock market investor application, a sporting news application, a business news application, a general news application, a gaming application, a software as a service application or a cloud computing application.

* * * * *